United States Patent
Roh

(10) Patent No.: US 10,118,491 B2
(45) Date of Patent: Nov. 6, 2018

(54) CONTROL METHOD FOR FUEL CELL VEHICLE

(71) Applicant: HYUNDAI MOTOR COMPANY, Seoul (KR)

(72) Inventor: Min Hyun Roh, Yongin-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 1018 days.

(21) Appl. No.: 14/552,346

(22) Filed: Nov. 24, 2014

(65) Prior Publication Data

US 2015/0328991 A1   Nov. 19, 2015

(30) Foreign Application Priority Data

May 15, 2014 (KR) .................. 10-2014-0058486

(51) Int. Cl.
| | |
|---|---|
| *B60L 3/00* | (2006.01) |
| *B60L 11/18* | (2006.01) |
| *H01M 16/00* | (2006.01) |
| *H01M 8/04223* | (2016.01) |
| *H01M 8/04664* | (2016.01) |

(Continued)

(52) U.S. Cl.
CPC .............. *B60L 3/00* (2013.01); *B60L 3/0053* (2013.01); *B60L 11/18* (2013.01); *B60L 11/1861* (2013.01); *B60L 11/1887* (2013.01); *H01M 8/04223* (2013.01); *H01M 8/04679* (2013.01); *H01M 10/613* (2015.04); *H01M 10/625* (2015.04); *H01M 16/006* (2013.01); *H01M 2220/20* (2013.01); *H01M 2250/20* (2013.01); *Y02T 90/32* (2013.01)

(58) Field of Classification Search
None
See application file for complete search history.

(56) References Cited

U.S. PATENT DOCUMENTS

| | | | |
|---|---|---|---|
| 2007/0202367 A1* | 8/2007 | Yoshida | H01M 8/04089 429/434 |
| 2012/0056478 A1* | 3/2012 | Omoto | B60L 3/0046 307/11 |

FOREIGN PATENT DOCUMENTS

| | | |
|---|---|---|
| JP | 2007-157477 A | 6/2007 |
| JP | 2010-003496 A | 1/2010 |

(Continued)

OTHER PUBLICATIONS

Korean Notice of Allowance issueed in Application No. 10-2014-0058486 dated Feb. 24, 2016.

(Continued)

*Primary Examiner* — Mussa A Shaawat
*Assistant Examiner* — Kyung J Kim
(74) *Attorney, Agent, or Firm* — McDermott Will & Emery LLP

(57) ABSTRACT

A control method for a fuel cell vehicle includes a failure determining step of determining whether or not a failure exists in a fuel cell system. A safe driving step stops an operation of the fuel cell system and drives the vehicle using only a high voltage battery system when the failure exists in the fuel cell system. A temporary stopping step determines a driving state of the vehicle and temporarily stops an operation of the high voltage battery system when it is determined that the driving state is a stop state. A re-driving step re-operates the high voltage battery system to restart the vehicle when the driving state is converted into a start state.

5 Claims, 4 Drawing Sheets

(51) Int. Cl.
*H01M 10/625* (2014.01)
*H01M 10/613* (2014.01)

(56) References Cited

FOREIGN PATENT DOCUMENTS

| | | |
|---|---|---|
| JP | 2010-023715 A | 2/2010 |
| JP | 2012-086783 A | 5/2012 |
| KR | 10-2004-0045743 A | 6/2004 |
| KR | 10-2008-0053994 A | 6/2008 |
| KR | 10-2008-0095311 A | 10/2008 |
| KR | 10-2009-0095530 A | 9/2009 |
| KR | 10-1124984 B1 | 3/2012 |
| KR | 10-2012-0083066 A | 7/2012 |
| KR | 10-2013-0045337 A | 5/2013 |

OTHER PUBLICATIONS

Korean Office Action issued in corresponding Korean Patent Application No. 10-2014-0058486, dated Oct. 27, 2015.

\* cited by examiner

[FIG. 2]
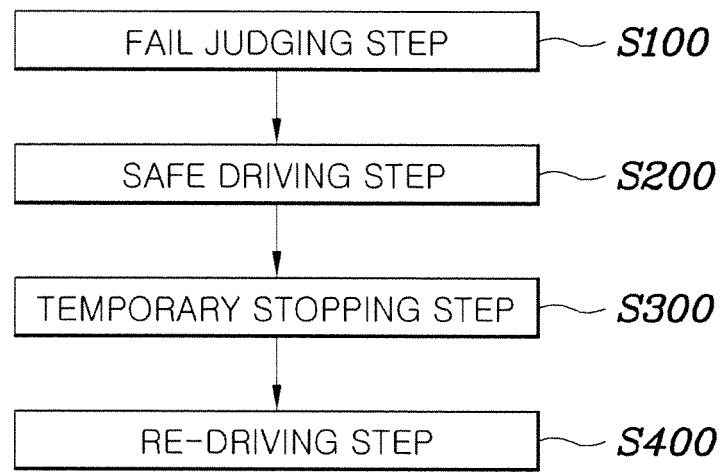

[FIG. 3]
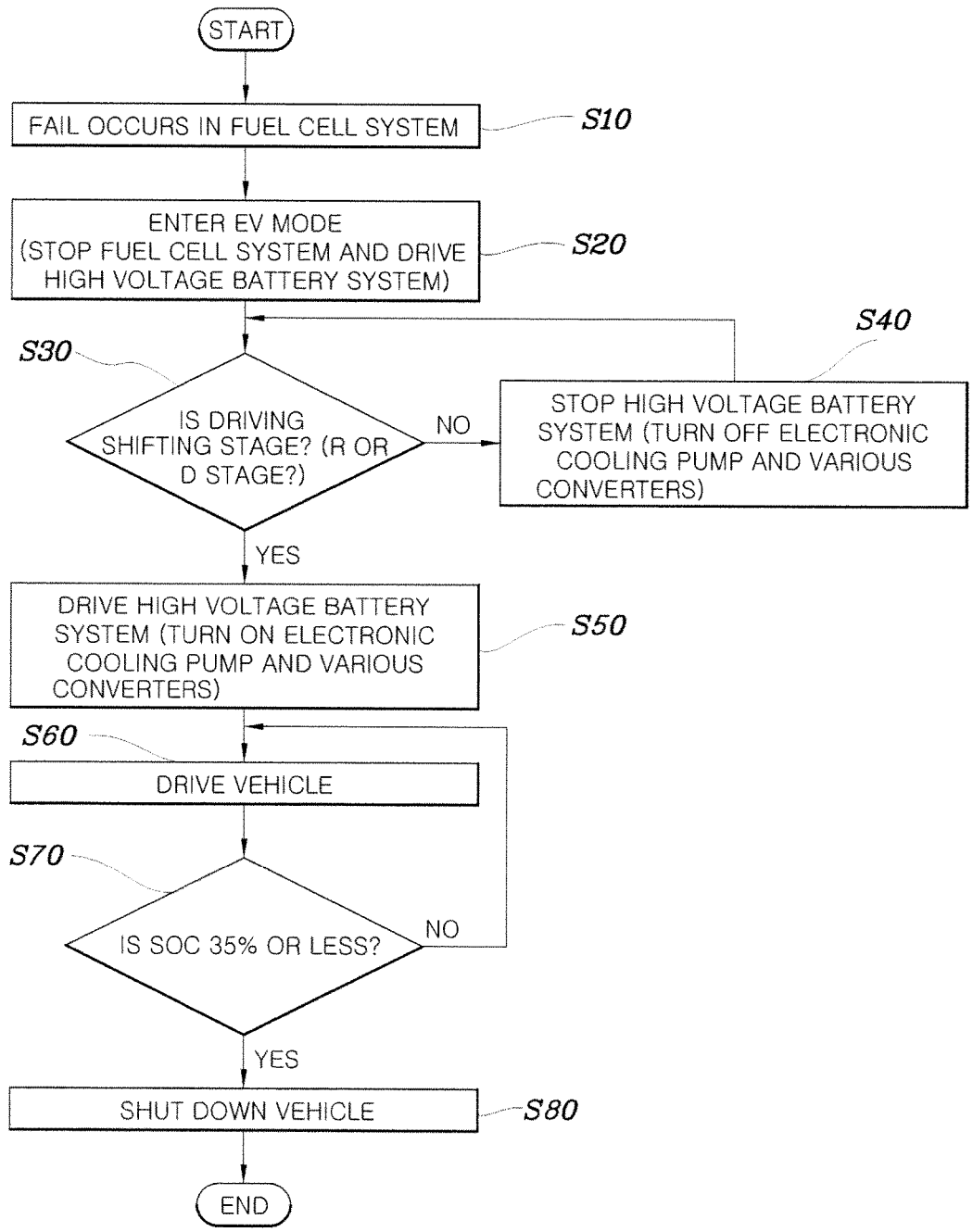

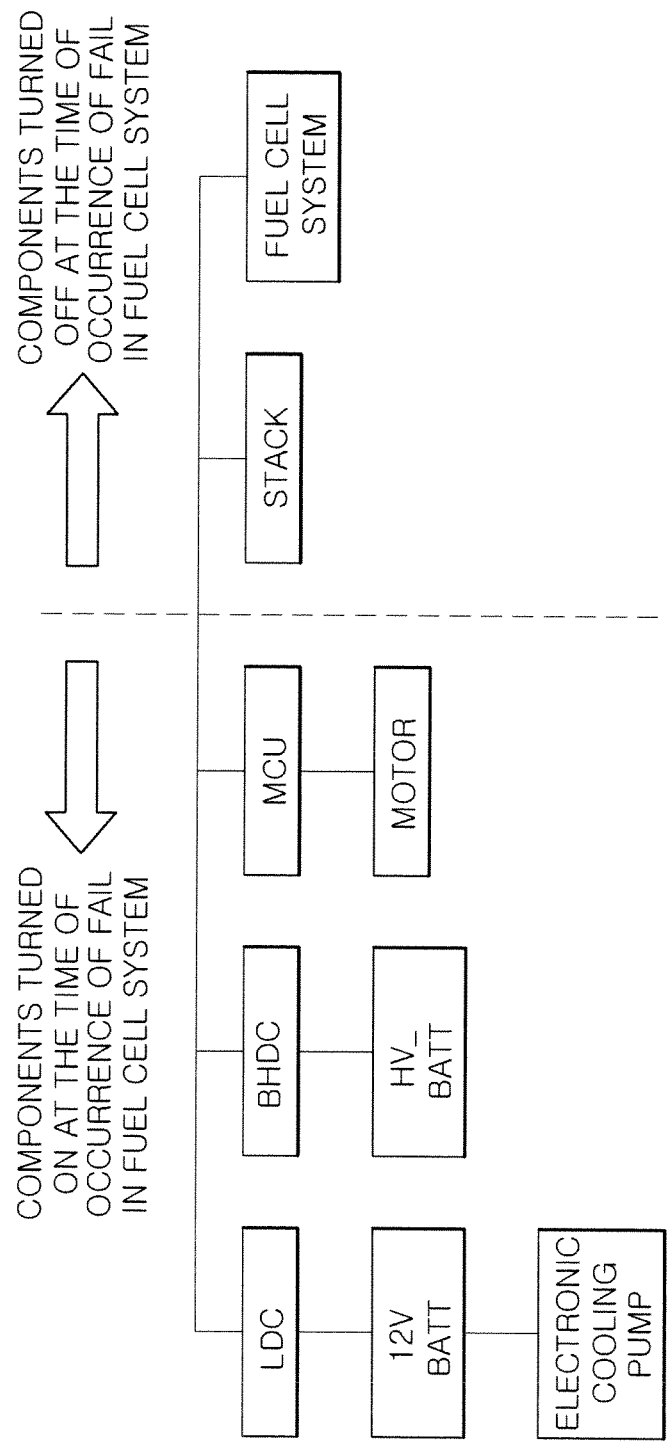

CONTROL METHOD FOR FUEL CELL VEHICLE

CROSS-REFERENCE TO RELATED APPLICATION

The present application claims the benefit of priority to Korean Patent Application Number 10-2014-0058486 filed on May 15, 2014, the entire contents of which application are incorporated herein for all purposes by this reference.

TECHNICAL FIELD

The present disclosure relates to a control method for a fuel cell vehicle capable of increasing a driving distance and a driving time using a limited battery amount in a high voltage battery.

BACKGROUND

Researches into environment-friendly vehicles such as a fuel cell vehicle which discharges only water have been actively conducted due to a global warming phenomenon or the like.

Referring to FIG. 1, a fuel cell vehicle includes a fuel cell stack S generating electricity to provide electrical energy. An air supplying system 10, a hydrogen supplying system 20, and a cooling system 30 are separated from each other in order to generate the electricity in the fuel cell stack.

The air supplying system 10 has a humidifier 12 humidifying fuel and air, and supplying the humidified fuel and air to the fuel cell stack S. An air blower 14 supplies the air containing oxygen to the humidifier 12. The air blower 14 has a filter 16 for removing foreign materials of external air and an air compressor for compressing the air and providing the compressed air to the humidifier 12.

The hydrogen supplying system 20 has a hydrogen supplying tank 22 for supplying hydrogen, a hydrogen supplying valve 24 for adjusting a hydrogen supply amount, a hydrogen re-circulator 26 for re-circulating some of the hydrogen supplied into the fuel cell, and the like.

The cooling system 30 is provided with a radiator 34 including a radiator fan 32 for radiating heat of a coolant, and a thermostat 36 for adjusting an amount of a supplied coolant, and the like.

The fuel cell vehicle further includes a fuel cell load device 40 to prevent an excessive voltage rise at the time of charging the electricity.

When there is a failure in the fuel cell system, the fuel cell vehicle as described above runs using only a limited battery amount available in a high voltage battery. In this case, since a battery capacity is restrictive, a driving time and a driving distance may be limited.

However, in the fuel cell vehicle according to the related art, an electronic coolant pump constantly operates in order to cool electronic components including a Bi-directional High voltage DC-DC converter (BHDC) and a Low voltage DC-DC converter (LDC) when driving by the high voltage battery, thus consuming an unnecessary stage of charge (SOC).

Therefore, it is necessary to decrease consumption of the SOC when the failure occurs in the fuel cell vehicle.

The matters described as the related art have been provided only for assisting in the understanding for the background of the present disclosure and should not be considered as corresponding to the related art known to those skilled in the art.

SUMMARY

An aspect of the present disclosure provides a control method for a fuel cell vehicle capable of decreasing unnecessary consumption of a limited battery amount in a high voltage battery at the time of driving the fuel cell vehicle when a failure exists in a fuel cell system.

According to an exemplary embodiment of the present inventive concept, a control method for a fuel cell vehicle includes determining whether or not a failure exits in a fuel cell system. A safe driving step stops an operation of the fuel cell system and drives the vehicle using only a high voltage battery system when the failure exists in the fuel cell system. A temporary stopping step checks a driving state of the vehicle and temporarily stops an operation of the high voltage battery system when it is confirmed that the driving state is a stop state. A re-driving step re-operates the high voltage battery system to restart the vehicle when the driving state is converted into a start state.

In the safe driving step, a battery amount in the high voltage battery system may be checked, and the vehicle may run using an electrical energy charged in a high voltage battery when it is determined that the battery amount is sufficient.

In the temporary stopping step, an operation of a cooling device for cooling the high voltage battery system among electronic components driven by an auxiliary battery may temporarily stop.

In the temporary stopping step, the operation of the high voltage battery system may stop when the driving state is the stop state and a shifting stage shifts to a neutral stage or a parking stage.

In the re-driving step, the operation of the high voltage battery system may immediately perform, when a shifting stage is shifted to a driving stage.

In the re-driving step, the operations of both of the fuel cell system and the high voltage battery system may stop when a battery amount in the high voltage battery system reaches a threshold value, thereby shutting down the vehicle.

BRIEF DESCRIPTION OF THE DRAWINGS

FIG. 2 is a flow chart of a control method for a fuel cell vehicle according to an exemplary embodiment of the present inventive concept.

FIGS. 3 and 4 are views for assisting in description of the control method for a fuel cell vehicle according to an exemplary embodiment of the present inventive concept.

DETAILED DESCRIPTION

Figure 1:
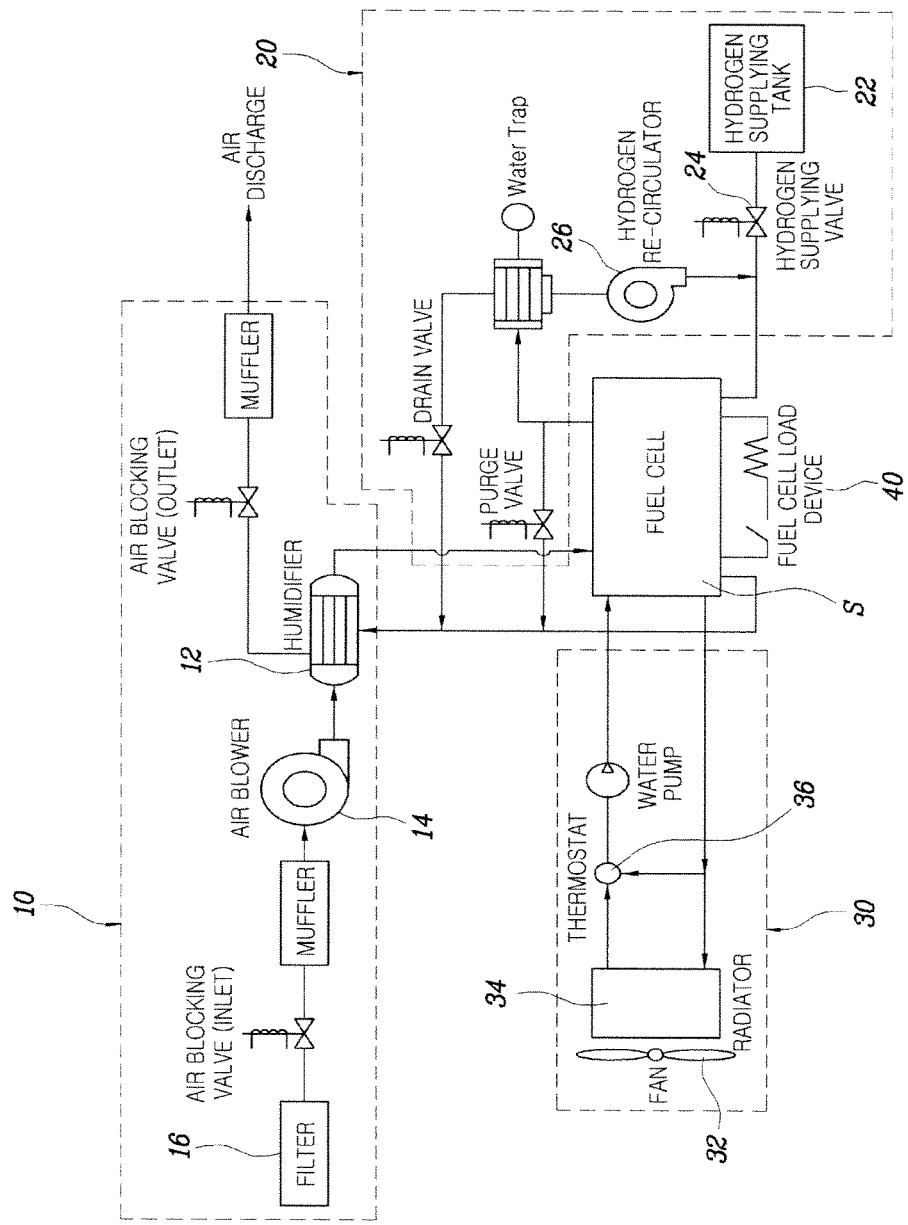
FIG. 1 is a configuration diagram showing a fuel cell system according to a related art.

Hereinafter, a control method for a fuel cell vehicle according to an exemplary embodiment of the present inventive concept will be described with reference to the accompanying drawings.

The riving method for a fuel cell vehicle according to present disclosure decreases a fuel consumption amount to secure a driving distance and a driving time while driving.

Generally, the fuel cell vehicle comprises a fuel cell system including a fuel cell stack. An air supplying system supplies air to the fuel cell stack, and a hydrogen supplying system supplies hydrogen to the fuel cell stack to generate electrical energy by mixing the hydrogen and oxygen with each other.

In addition, the fuel cell vehicle includes a high voltage battery system for storing the electrical energy generated in the fuel cell stack or transferring the stored electrical energy to an electrical motor or various electronic components. The high voltage battery system includes a Bi-directional High voltage DC-DC converter (BHDC), a Low voltage DC-DC converter (LDC), a motor controller unit (MCU), and the like.

Since the high voltage battery system uses high voltage electrical energy, it generates high heat. Therefore, the high voltage battery system is provided with a cooling system in order to prevent the electronic components from being damaged by the high heat. Particularly, in the cooling system, an electronic cooling pump is provided in order to circulate a coolant, wherein the electronic cooling pump operates by receiving electrical energy from an auxiliary battery of 12V.

When a failure occurs in the fuel cell system of the present disclosure, the high voltage battery system and the cooling system are controlled depending on a driving situation to minimize energy loss, thereby allowing a driving distance and a driving time to be secured.

FIG. 2 is a flow chart of a control method for a fuel cell vehicle according to an exemplary embodiment of the present inventive concept. FIGS. 3 and 4 are views for assisting in description of the control method for a fuel cell vehicle according to an exemplary embodiment of the present inventive concept.

The control method for a fuel cell vehicle according to an exemplary embodiment of the present inventive concept includes a failure determining step (S100) of determining whether or not a failure exists in the fuel cell system. A safe driving step (S200) stops an operation of the fuel cell system and drives the vehicle using only the high voltage battery system when the failure exists in the fuel cell system. A temporary stopping step (S300) checks a driving state of the vehicle and temporarily stops an operation of the high voltage battery system when the driving state is a stop state. A re-driving step (S400) re-operates the high voltage battery system to restart the vehicle when the driving state is converted into a start state.

In the present disclosure, the failure determining step (S100) determines whether or not the failure exists in the fuel cell system. Various methods, such as a method of measuring an alternating current (AC) impedance of the fuel cell, a method of estimating a wet state of an electrolyte membrane, and the like, may be used as a method of determining whether or not the failure exists in the fuel cell system.

The fail judging step (S100) determines whether or not the failure exists in the fuel cell system as described above, and the safe driving step (S200) stops the operation of the fuel cell system and drives the vehicle using only the high voltage battery system (S20) when it is determined that the failure exists in the fuel cell system (S10).

That is, since damage to other components or a risk of explosion is caused when the fuel cell system having the failure continuously operates, the operation of the fuel cell system terminates, and the vehicle runs using only the high voltage battery system.

Here, a battery amount of the high voltage battery system is checked, the vehicle runs using electrical energy charged in the high voltage battery when it is determined that the battery amount is sufficient, and the vehicle is shut down when it is determined that the battery amount is insufficient, thereby preventing damage to the high voltage battery system.

As described above, since the battery amount charged in the high voltage battery is restrictive at the time of driving the vehicle using only the high voltage battery system, a driving distance and a driving time are determined. It is important to secure the driving distance and the driving time so that the vehicle may move to a safe region or a surrounding repair shop at the time of driving the vehicle using only the restrictive battery amount.

In the present disclosure, the temporary stopping step (S300) and the re-driving step (S400) repeatedly perform in order to secure the driving distance and the driving time depending on the restrictive battery amount.

In detail, the driving state of the vehicle is checked (S30), the temporary stopping step (S300) checks a driving state of the vehicle and temporarily stops the operation of the high voltage battery system when it is confirmed that the driving state is the stop state (S40), and the re-driving step (S400) re-operates the high voltage battery system to restart the vehicle when the driving state is converted into the start state (S50).

That is, referring to FIG. 4, when the vehicle stops, the driving of all of the electronic components such as the BHDC, the LDC, the MCU, and the like, of the high voltage battery system stops to secure the remained electrical energy in the high voltage battery.

Here, the high voltage battery system stops operating, and operations of various electronic components driven by power of the auxiliary battery of 12V are maintained, such that a controller operates normally. However, in the temporary stopping step (S300), an operation of a cooling device for cooling the high voltage battery system among the electronic components driven by the auxiliary battery may temporarily stop.

That is, in the temporary stopping step (S300), the entire operation of the high voltage battery system stops in a state in which the vehicle stops, thereby preventing unnecessary loss of the electrical energy. When the entire operation of the high voltage battery system stops as described above, heat that has been generated at the time of driving the high voltage battery system is not generated. Therefore, the operation of the cooling device temporarily stops, thereby minimizing energy loss. Therefore, the driving distance and the driving time that may be secured by the battery amount remaining in the high voltage battery system further increase.

In the temporary stopping step (S300), the operation of the high voltage battery system may stop when the driving state is the stop state, and a shifting stage is shifted to a neutral stage or a parking stage (S40).

The vehicle may stop by stepping on a brake pedal. However, when the vehicle stops by stepping on the brake pedal, re-driving generally starts immediately. In this situation, when the high voltage battery system repeatedly stops and re-drives, a load may be generated in the high voltage battery system or an additional error may occur due to control conflict.

Therefore, when a driving speed becomes 0 after the vehicle stops such that a shifting stage shifts to a neutral stage or the parking stage, the high voltage battery system stops operating.

Additionally, the driving speed of the vehicle may be measured using a speed sensor, and the operation of the high voltage battery system may stop when the driving speed becomes 0.

In the re-driving step (S400), the operation of the high voltage battery system may be immediately performed when the shifting stage is shifted to a driving stage (S50).

That is, when the shifting stage shifts to the driving stage, the high voltage battery system immediately operates even though an acceleration pedal is stepped on, such that the vehicle restarts immediately when a driver steps on the acceleration pedal (S60).

As described above, the vehicle restarts as soon as the driver requests vehicle acceleration at the time of starting the vehicle in a state in which the vehicle stops, thereby providing a smooth driving feeling.

In the re-driving step (S400), the operations of both of the fuel cell system and the high voltage battery system stop when the battery amount in the high voltage battery system reaches a threshold value, thereby shutting down the vehicle (S70).

That is, the driving distance and the driving time are maximally secured through the temporary stopping step (S300) and the re-driving step (S400), such that even though the vehicle runs, the electrical energy stored in the high voltage battery is continuously consumed.

When the consumed battery amount reaches the threshold value, it is determined that it is dangerous to completely stop the driving of the high voltage battery system, thereby preventing secondary damage to the high voltage battery and an accident (S80).

In the control method for a fuel cell vehicle according to an exemplary embodiment of the present inventive concept described above, the consumption of the electrical energy is decreased by performing the temporary stopping step (S300) and the re-driving step (S400) at ordinary times as well as at the time of occurrence of the fail in the fuel cell system, thereby improving driving efficiency.

Since it is particularly important to secure the driving distance and the driving time when the failure occurs in the fuel cell system, the driving distance and the driving time are maximally secured by performing the temporary stopping step (S300) and the re-driving step (S400) at the time of the occurrence of the failure in the fuel cell system.

In the control method for a fuel cell vehicle according to an exemplary embodiment of the present inventive concept, the operation of the fuel cell stack stops, and the vehicle runs using only the limited battery amount in the high voltage battery when the failure exits in the fuel cell system, thereby preventing an accident due to the damage to the fuel cell stack.

Furthermore, after the fuel cell system stops, the vehicle runs using only the limited battery amount in the high voltage battery, and an operation of an unnecessary system stops when the vehicle stops, thereby preventing the limited remaining battery amount from being unnecessarily consumed.

Therefore, the driving distance and the driving time depending on the battery amount in the high voltage battery may be further secured.

Although the present inventive concept has been shown and described with respect to specific exemplary embodiments, it will be obvious to those skilled in the art that the present disclosure may be variously modified and altered without departing from the spirit and scope of the present disclosure as defined by the following claims.

What is claimed is:

1. A control method for a fuel cell vehicle, the method comprising:
    a failure determining step of determining whether or not a failure exists in a fuel cell system;
    a safe driving step of stopping an operation of the fuel cell system and driving the vehicle using only a high voltage battery system when the failure exists in the fuel cell system;
    a temporary stopping step of determining a driving state of the vehicle and temporarily stopping an operation of the high voltage battery system when it is determined that the driving state is a stop state; and
    a re-driving step of re-operating the high voltage battery system to restart the vehicle when the driving state is converted into a start state,
    wherein in the temporary stopping step, an operation of a cooling device for cooling the high voltage battery system among electronic components driven by an auxiliary battery temporarily stops.

2. The control method of claim 1, wherein in the safe driving step, a battery amount in the high voltage battery system is checked, and the vehicle runs using an electrical energy charged in a high voltage battery if the battery amount is sufficient.

3. The control method of claim 1, wherein in the temporary stopping step, the operation of the high voltage battery system stops in the case in which the driving state is the stop state and a shifting stage is shifted to a neutral stage or a parking stage.

4. The control method of claim 1, wherein in the re-driving step, the operation of the high voltage battery system is immediately performed, when a shifting stage is shifted to a driving stage.

5. The control method of claim 1, wherein in the re-driving step, the operations of both of the fuel cell system and the high voltage battery system stop when a battery amount in the high voltage battery system reaches a threshold value, thereby shutting down the vehicle.

* * * * *